United States Patent [19]
Taaffe

[11] Patent Number: 5,456,443
[45] Date of Patent: Oct. 10, 1995

[54] ANCHORING DEVICE AND METHOD

[76] Inventor: Gary M. Taaffe, 48 Lakeview Crescent, Forster, Australia, 2428

[21] Appl. No.: 186,769

[22] Filed: Jan. 25, 1994

[30] Foreign Application Priority Data

Jan. 25, 1993 [AU] Australia ................. PL6975

[51] Int. Cl.⁶ ................................. F16M 13/00
[52] U.S. Cl. ................... 248/551; 70/DIG. 57; 248/499
[58] Field of Search .................. 248/499, 551, 248/552; 410/101; 52/698, 700, 707, 712, 713; 70/DIG. 57, 237, 30

[56] References Cited

U.S. PATENT DOCUMENTS

| | | | |
|---|---|---|---|
| 1,455,970 | 5/1923 | Resek | 248/551 X |
| 2,962,245 | 11/1960 | Molzan | 248/499 X |
| 4,198,026 | 4/1980 | Capolupo | 70/DIG. 57 |
| 4,490,997 | 1/1985 | Hughes | 70/18 X |
| 4,615,554 | 10/1986 | Schilla | 52/698 X |
| 4,645,392 | 2/1987 | Takaguchi | 248/499 X |

*Primary Examiner*—J. Franklin Foss
*Attorney, Agent, or Firm*—Darby & Darby

[57] ABSTRACT

The present invention relates to an anchoring device particularly useful for the anchoring of vehicles, bicycles, motorbikes, televisions, VCR, etc. The device 1 comprises an anchor means 13, able to be securely fastened to a substrate surface, having an upwardly protruding portion 16 provided with an orifice 17 therethrough. Over the anchor means 13, is supplied a covering means 14 to substantially cover the anchor means 13 except for the protruding portion 16. In use, with the covering means 14 covering the anchor means 13, a padlock, chain, wire or the like is supplied through the orifice 17, such that the covering means 14 is unable to be removed from the anchor means 16. Consequently, access to the anchor means, for removal of the device 1 from the subtsrate, is prevented.

11 Claims, 3 Drawing Sheets

ANCHORING DEVICE AND METHOD

BACKGROUND OF THE INVENTION

The present invention relates to an anchoring device and method, and in particular, to a device and method for anchoring a vehicle, motorbike, bicycle, television, VCR, etc. to a substrate surface, such that removal of the vehicle or other device is substantially prevented.

Numerous attempts in a varying range of fields have been made with the ultimate intent to prevent unauthorised use of vehicles and the like. These include devices which might be attached to, say the steering wheel of a vehicle to prevent movement of the steering wheel, devices which alert by means of audible warnings of the presence of an intruder, and, devices which are configured with or connected to engine components of a vehicle to prevent operation of the vehicle.

It is of course also known to utilise chains and padlocks to connect a vehicle, motorbike or bicycle to a fixed object or heavy article, such as a street sign, post or article of furniture such that movement of the vehicle, motorbike or bicycle is substantially prevented.

In fact, in recent times, due to persons tending to ignore audible alarms, the more original forms of utilising padlock and chain tend to provide a more effective means for preventing the unauthorised use of a vehicle, motorbike or bicycle. The chain or cable type arrangement has the advantage that it is able to be weaved through various components of the vehicle, motorbike or bicycle, such that removal of even a portion of the vehicle, motorbike or bicycle is prevented.

Utilisation of a chain or cable or the like is however heretofore been dependent upon the location of a fixed or heavy article such as a post, street sign or article of furniture for connection of the vehicle, motorbike or bicycle thereto.

SUMMARY OF THE INVENTION

The present invention seeks to provide a custom made anchoring device which is able to be utilised in combination with a known cable, chain and/or padlock device for securing a vehicle, motorbike or bicycle thereto.

The present invention also seeks to provide such an anchoring device which is not able to be tampered, with such that unauthorised operation or use of the vehicle, motorbike or bicycle is substantially prevented.

The present invention also seeks to provide a device which is compatibly attached to the vehicle, motorbike or bicycle for connection to said anchoring device.

In one broad form, the present invention provides an anchoring device, comprising:

anchor means, adapted to be securely fastened to a substrate surface by fastening means, and having an upwardly protruding portion provided with a substantially horizontally disposed orifice therethrough; and, covering means adapted to substantially cover said anchor means except for said protruding portion;

wherein, in use, with said covering means covering said anchor means, and a padlock, chain, wire and/or the like supplied through said orifice, said covering means is unable to be removed from said anchor means.

Preferably, said upwardly protruding portion is centrally located in said anchor means.

Also preferably, said fastening means is comprised of one or more bolt(s), screw(s), dynabolt(s), adhesive and/or other means for fastening.

Preferably, said substrate surface is a concrete floor and wherein said anchor means is set in said concrete floor.

Also preferably, each of said anchor means and covering means are substantially circular in cross-section.

Preferably, when used to anchor a vehicle, motorbike, or the like to said substrate surface via said padlock, chain wire and/or the like.

Also preferably, said chain, wire or the like is means is supplied through various components of said vehicle, motorbike, bicycle, or the like.

Most preferably wherein said device is manufactured of hardened steel, plastics or metal material.

In a preferred form of the invention the vehicle, motorbike, bicycle or the like is provided with a retractable chain, wire, cable or the like for connection via a padlock or the like to said orifice.

Also preferably, wherein said chain, cable, wire or the like forms at least part of a circuit such that, in the event that said chain, cable or the like is cut, broken, or otherwise disconnected, an alarm signal is issued.

In a further broad form, a method of anchoring a vehicle, motorbike, bicycle, or the like to a substrate surface, comprising the steps of:

fastening an anchor means, which has an upwardly protruding portion provided with a substantially horizontally disposed orifice therethrough, to a substrate surface;

supplying a covering means substantially over said anchor means except for said protruding portion; and, connecting a padlock, chain, wire, and/or the like through said orifice and through at least one component of said vehicle such that said covering means is thereafter unable to be removed from said anchor means.

BRIEF DESCRIPTION OF THE DRAWINGS

The present invention will become more fully understood from the following detailed description of preferred but non-limiting embodiments thereof, described in connection with the accompanying drawings, wherein.

DETAILED DESCRIPTION OF THE DRAWINGS

Figure 1A:
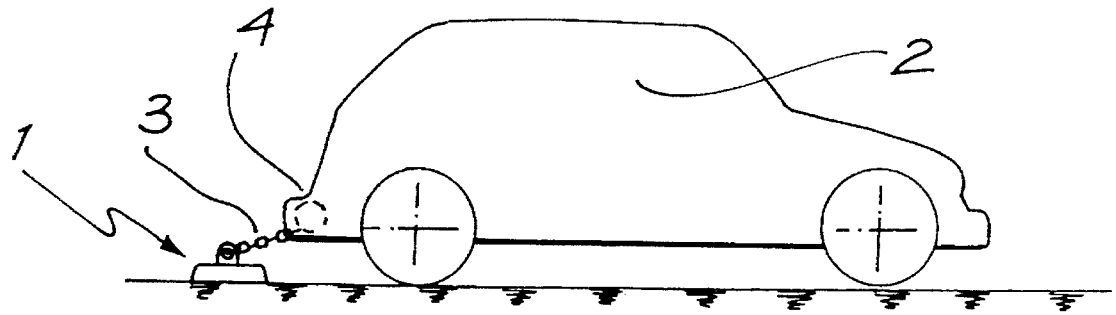
FIG. 1, in FIGS. 1(a) and 1(b) respectively, illustrate how the anchoring device of the present invention may be connected to a motor vehicle.

Throughout the description, like numerals will be used to identify like features in the drawings, except where expressly otherwise indicated.

Figure 1B:
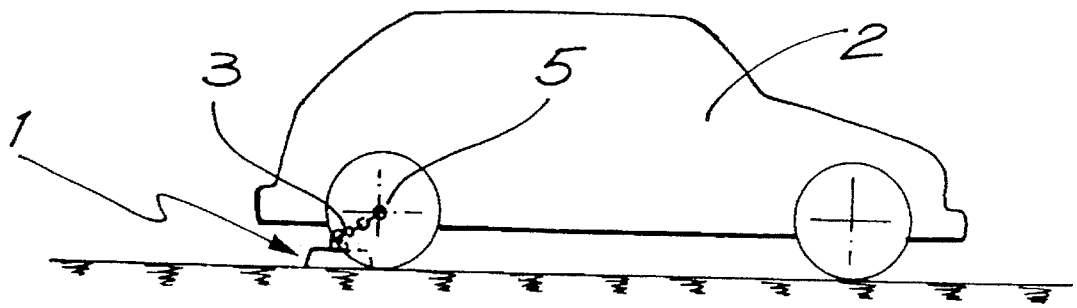

As shown in FIG. 1, the anchoring device 1 is connected to a vehicle 2 by means of a chain, cable or the like 3. FIG. 1(a) illustrates the chain being connected to the back portion 4 of a vehicle 2, whilst FIG. 1(b) illustrates the chain being connected to the axle 5 of the vehicle 2. It will be appreciated that the device may be connected to any suitable part of the vehicle, motorbike or bicycle or other object as desired.

Figure 2:
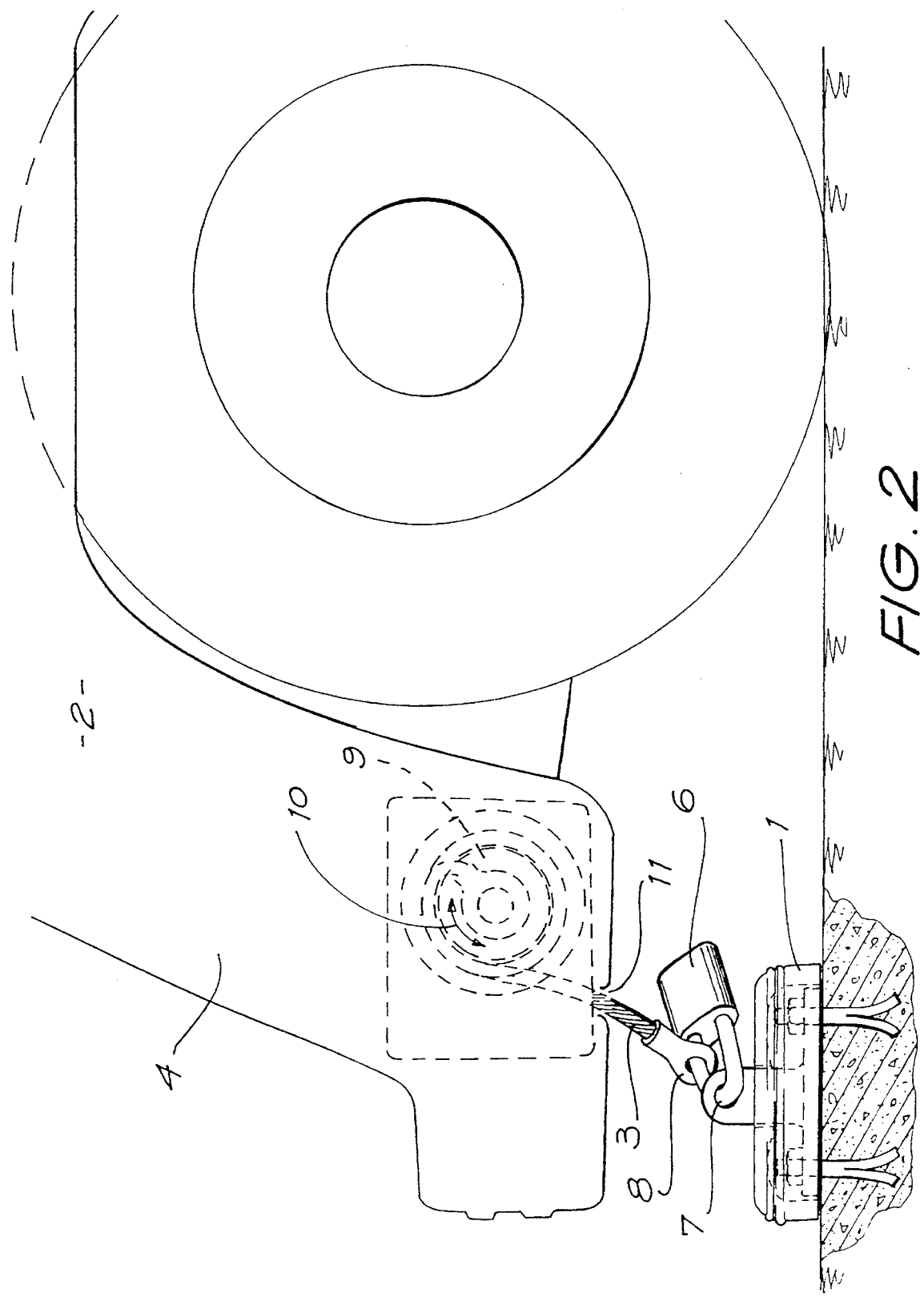
FIG. 2 details connection of an anchoring device to a motor vehicle, having a retractable cable device therein.

As shown in FIG. 2, which shows an enlarged view of the anchoring device 1 connected to the back portion 4 of the vehicle 2 by means of a cable or the like 3, the cable is connected to the anchoring device 1, and in particular via a padlock or like locking mechanism 6 through an orifice 7 provided in the anchoring device 1 and an orifice 8 or chain link 8 provided in a cable or chain 3. FIG. 2 also illustrates the preferred implementation of the invention wherein the cable or chain is connected in the vehicle 2 by a retraction device 9, which, for example, may rotate in the direction indicated by arrows 10. For example, the cable 3 may be supplied internally of the back body portion 4 of vehicle 2 and when the car is driven into a garage or the like, the cable is pulled out from the retraction device through opening 11 to a position near the orifice 7 and a padlock is supplied through the orifices 7 and 8 and securely locked by means of a key, combination lock, or the like. Consequently, the vehicle 2 is securely fastened to the substrate surface.

The novelty of the invention resides in the configuration of the anchoring device 1, preferably taken in combination with the retraction mechanism supplied in the vehicle.

Figure 3:
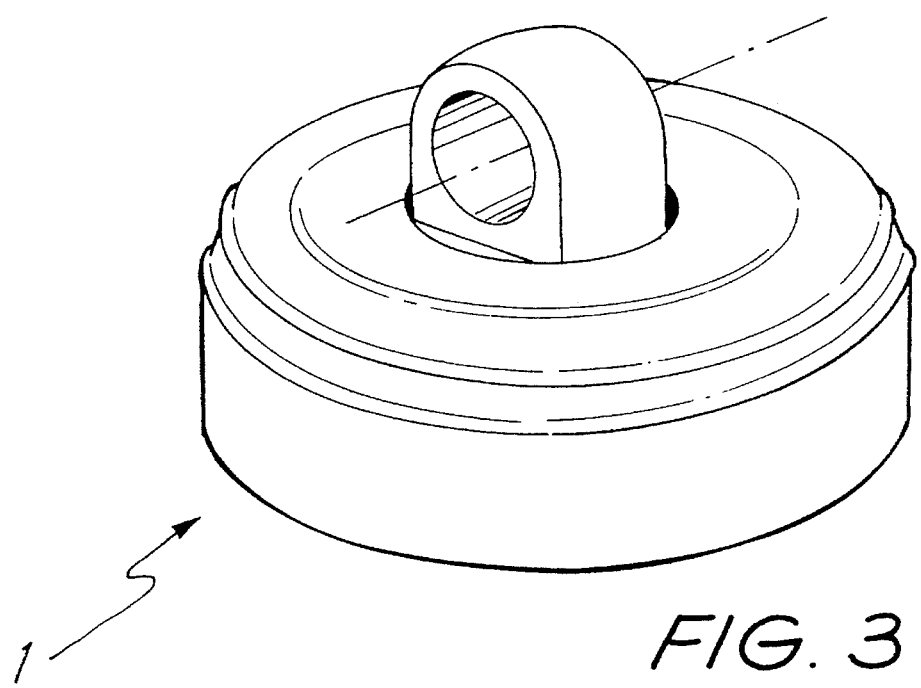
FIG. 3 illustrates an isometric view of the anchoring device of the present invention.
Figure 4:
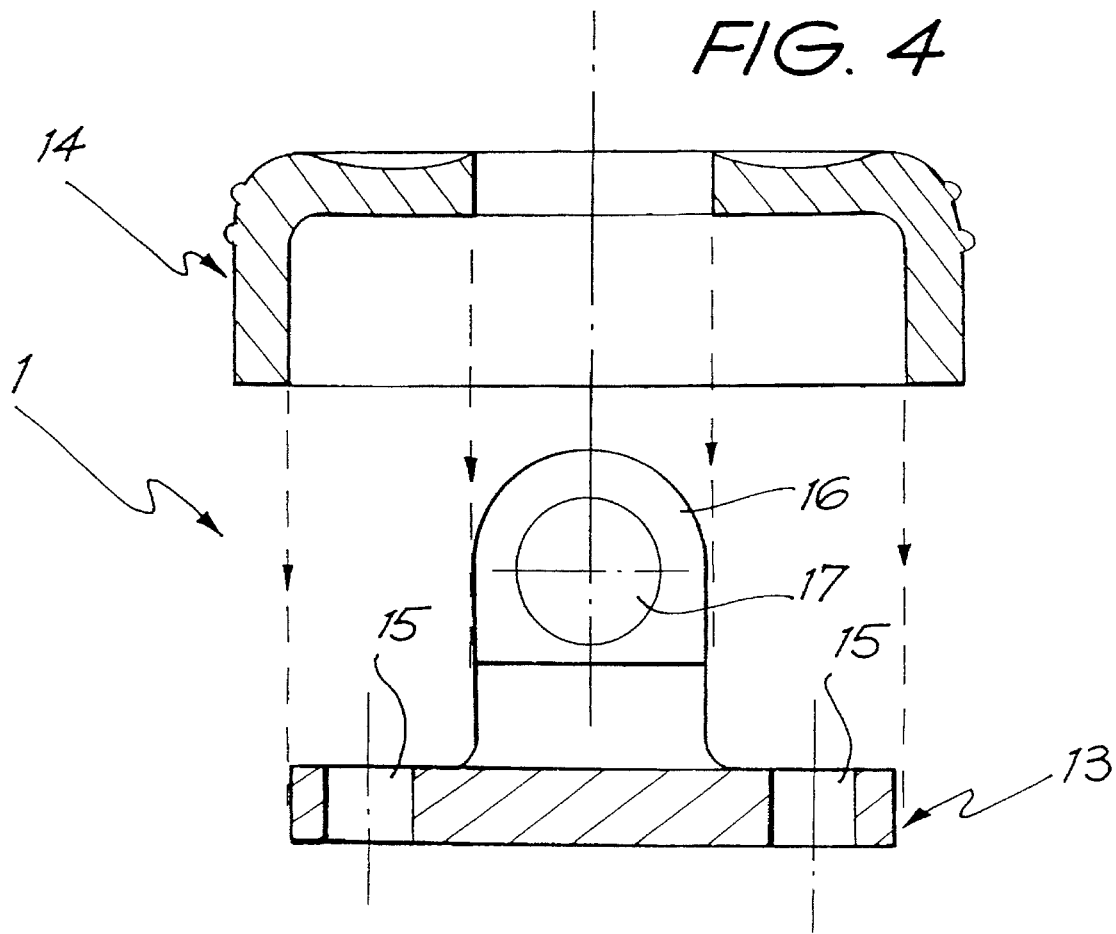
FIG. 4 illustrates a cross-sectional view through the centre of the anchoring device.

Isometric and cross-sectional views of the anchoring device 1 are shown in FIGS. 3 and 4 respectively. As shown in FIGS. 3 and 4, the anchoring device comprises an anchor means 13 and a covering 14. The anchor means is adapted to be securely fastened to a substrate surface, by fastening means, such as dynabolts, screws, or the like, through holes 15. Alternatively, the anchor means could be fastened to the substrate surface by adhesive, or even by setting in concrete. The anchor means 13 has an upwardly protruding portion 16 provided with an orifice 17 therethrough.

The covering means is adapted to substantially cover the anchor means except the protruding portion 16 thereof.

In use, when the covering means covers the anchor means 13 and a padlock, chain, wire and/or the like is supplied through the orifice 17, a covering 14 is thereafter unable to be removed from anchor means 13. Consequently, tampering with the fastening means supplied through the holes 15 is then not possible.

Most preferably, the anchoring device and its covering means are substantially circular in cross-section. By this configuration, if an intruder attempts to tamper with the anchoring device, rotation of the covering 14 is facilitated about the anchor means rendering any leverage or tampering with the covering means in an attempt to remove same.

As previously mentioned, in use, the device may be utilised to connect or fasten a vehicle, motorbike or bicycle thereto. Obviously, however, it will be appreciated the numerous other applications would be possible for the anchoring device. For example, in motels, the device could be utilised for the fastening of televisions, videos, etc., by chains or cables to built-in furniture, etc.

Most preferably, the device is manufactured of hardened steel, but obviously, it could be manufactured of plastics or metal material.

As mentioned, whilst fastening means such as dynabolts are preferably provided through the holes 15, an alternative version of the device may be wherein the anchoring means 13 is embedded in concrete applied to concrete or other substrate surface by adhesive material.

As discussed hereinbefore with reference to FIGS. 1 and 2, the anchoring device is preferably utilised in combination with some form of retraction device on a vehicle, motorbike, bicycle or the like. This makes it a little easier to use in that it is unnecessary to carry a separate chain, which could become lost or tangled. It is envisaged that the device could be utilised in domestic garages, it could also be utilised at service stations, car sales yards, etc., where vehicles are parked. It would be utilised in combination with an alarm type device connected to the anchoring means such that in the event that the cable or chain 3 is cut, an appropriate warning signal is supplied to a relevant authority to alert them to same. This application would be particularly useful in car sales yards, service stations, etc.

It will therefore be appreciated that the anchoring device of the present invention has a wide variety of applications. In use, it will be appreciated that to fasten a vehicle, motorbike, bicycle or the like to a substrate surface. Firstly, the anchor means is supplied and fastened in position to a substrate surface. A covering means is then supplied over the anchor means, covering all except the protruding portion, and then the chain, cable, wire or the like is connected thereto by means of a padlock or like device. Thereafter, the vehicle, motorbike or bicycle cannot be removed without causing damage to the vehicle.

It will be appreciated that variations and modifications will become apparent to persons skilled in the art. Such variations and modifications should be considered to fall within the spirit and scope of the invention as broadly described hereinbefore and as claimed hereinafter.

I claim:

1. An anchoring device, comprising:

anchor means of substantially circular cross-sectional shape, adapted to be securely fastened to a substrate surface by fastening means, and having an upwardly protruding portion centrally located in said anchor means and provided with a substantially horizontally disposed office therethrough; and, covering means of substantially circular cross-sectional shape adapted to freely rotate about and substantially cover said anchor means except for said protruding portion;

wherein, in use, with said covering means covering said anchor means, and a padlock, chain, wire and/or the like supplied through said orifice, said covering means is unable to be removed from said anchor means.

2. An anchoring device as claimed in claim 1, wherein said fastening means is comprised of one or more bolt(s), screw(s), dynabolt(s), adhesive and/or other means for fastening.

3. An anchoring device as claimed in claim 1, wherein said substrate surface is a concrete floor and wherein said anchor means is set in said concrete floor.

4. An anchoring device as claimed in claim 1, when used to anchor a vehicle, motorbike, or the like to said substrate surface via said padlock, chain wire and/or the like.

5. An anchoring device as claimed in claim 4, wherein said chain, wire or the like is supplied through various components of said vehicle, motorbike, bicycle, or the like.

6. An anchoring device as claimed in claim 1, wherein said device is manufactured of hardened steel, plastics or metal material.

7. An anchoring device as claimed in claim 5, wherein the vehicle, motorbike, bicycle or the like is provided with a retractable chain, wire, cable or the like for connection via a padlock or the like to said orifice.

8. An anchoring device as claimed in claim 7, wherein said chain, cable, wire or the like forms at least part of a circuit such that, in the event that said chain, cable or the like is cut, broken, or otherwise disconnected, an alarm signal is issued.

9. An anchoring device as claimed in claim 4, wherein the vehicle, motorbike, bicycle or the like is provided with a retractable chain, wire, cable or the like for connection via a padlock or the like to said orifice.

10. An anchoring device as claimed in claim 8, wherein the vehicle, motorbike, bicycle or the like is provided with a retractable chain, wire, cable or the like for connection via a padlock or the like to said orifice.

11. An anchoring device, comprising:

anchor means, adapted to be securely fastened to a substrate surface by fastening means, and having an upwardly protruding portion provided with a substantially horizontally disposed orifice therethrough; and, covering means adapted to substantially cover said anchor means except for said protruding portion;

wherein, in use, with said covering means coveting said anchor means, and a padlock, chain, wire and/or the like supplied through said orifice, said covering means is unable to be removed from said anchor means, when used to anchor a vehicle, motorbike, or the like to said substrate surface via said padlock, chain wire and/or the like, wherein said chain, wire or the like is supplied through various components of said vehicle, motorbike, bicycle, or the like, wherein the vehicle, motorbike, bicycle or the like is provided with a retractable chain, wire, cable or the like for connection via a padlock or the like to said orifice, and wherein said chain, cable, wire or the like forms at least part of a circuit such that, in the event that said chain, cable or the like is cut, broken, or otherwise disconnected, an alarm signal is issued.

* * * * *